Dec. 15, 1942.  R. B. HUNTER  2,305,345
SECURING DEVICE
Filed May 2, 1942
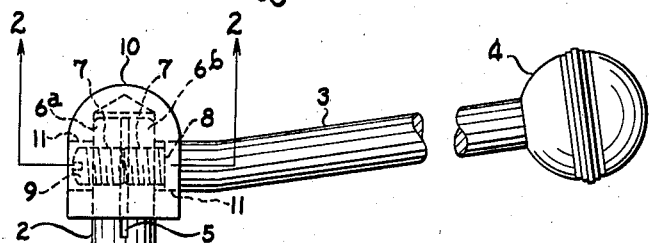
Fig. 1
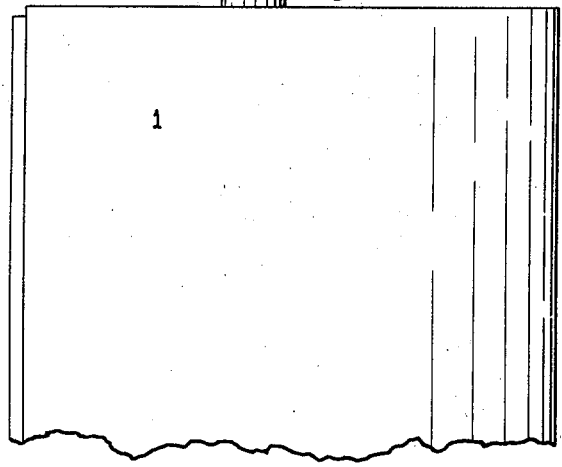
Fig. 2
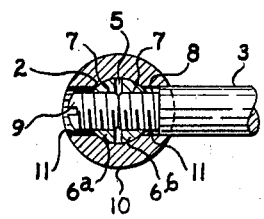
Inventor
Richard B. Hunter
By Frank H. Hubbard
Attorney Patented Dec. 15, 1942

2,305,345

UNITED STATES PATENT OFFICE 2,305,345

SECURING DEVICE

Richard B. Hunter, Shorewood, Wis., assignor to Cutler-Hammer, Inc., Milwaukee, Wis., a corporation of Delaware Application May 2, 1942, Serial No. 441,476

5 Claims. (Cl. 287—53)

This invention relates to devices for detachably securing an element such as an operating handle to the shaft of a controller.

The invention has among its objects to provide a handle construction having improved means associated therewith for securing the same to the operating shaft of a control device such as a drum controller.

Another object is to provide a handle construction of the aforesaid character having securing means which permits assembly of the handle in different positions upon the operating shaft to suit various positions in which the controller may be mounted.

Another object is to provide a simple, rugged and inexpensive means for securing a handle of rod form to an operating shaft in a manner to insure against casual loosening or displacement thereof.

Various other objects and advantages of the invention will hereinafter appear.

The accompanying drawing illustrates an embodiment of the invention which will now be described, it being understood that the embodiment illustrated is susceptible of modification without departing from the spirit and scope of the appended claims.

In the drawing,

Figure 1 is a fragmentary side elevational view of a controller having a handle construction embodying the invention associated therewith, and Fig. 2 is a fragmentary sectional view taken on line 2—2 of Fig. 1.

Referring to Fig. 1, the same illustrates an enclosed drum controller 1 of a conventional type having an operating shaft 2 which projects beyond the upper wall of the enclosing casing of the controller. An operating handle comprising a round rod 3 is secured to the upper end of shaft 2 and in the embodiment illustrated said handle is bent upwardly and has a ball shaped operating knob 4 fixed to the outer end thereof.

More specifically, the upper end of shaft 2 is provided with a diametrically disposed slot 5 forming resilient shaft sections 6ᵃ and 6ᵇ and said shaft is also provided with a diametrically disposed tapped opening 7 which extends through said shaft sections at an angle of 90 degrees with respect to said slot. Handle 3 is provided with a threaded end portion 8 which screws into the tapped opening 7 in one of the shaft sections 6 and the other shaft section 6 has a slotted set screw 9 screwed into the tapped opening 7 therein for engagement with the inner end of said handle. The shaft sections 6ᵃ and 6ᵇ fit snugly within a cup-shaped hub member 10 having side openings 11—11 for receiving handle 3 and set screw 9.

In assembling handle 3 upon shaft 2, cup member 10 is placed over the upper end of said shaft and the threaded portion 8 of the handle is inserted through an opening in one side of said cup member and screwed into the tapped opening 7 in shaft 2. As is apparent, handle 3 may be screwed into the tapped opening in shaft section 6ᵇ for mounting of the same in the position shown in the drawing, or the same may be screwed into the tapped opening 7 in the other shaft section 6ᵃ for mounting of said handle in an opposite position. Handle 3 is screwed into the tapped opening 7 of shaft 2 a sufficient distance to expose the inner end thereof within slot 5 and the same is then backed up slightly to bring the bent portion thereof into the desired angular relation with respect to the top of controller 1. The threaded portion 8 is preferably of such length that when the same is screwed full distance into the tapped opening 7 the inner end thereof projects into the slot 5. After handle 3 is adjusted to the desired position set screw 9 is inserted into the tapped opening 7 and is tightly screwed against the inner end of said handle. As is apparent, upon tightening of set screw 9 the resilient shaft sections 6ᵃ and 6ᵇ are forced apart to clamp the same within the opening in hub member 10 and the threaded section 8 of said handle is jammed within the tapped opening 7 whereby handle 3 is securely held against loosening upon shaft 2.

In connection with the foregoing it will be noted that the above described securing means provides for quick and easy assembly of the handle upon the operating shaft of the controller and is advantageous in that the same permits securement of the handle to the operating shaft in different positions to suit various positions in which the controller may be mounted.

What I claim as new and desire to secure by Letters Patent is:

1. In a handle construction, the combination with a shaft having a split end portion providing spaced resilient end sections, a hub member surrounding said end sections, an operating handle threaded into a tapped opening in one of said end sections and means for pressing said end sections apart to clamp the same against the interior of said hub member and for also jamming said handle within the tapped opening in said end section to secure the same in assembled position upon said shaft.

2. In a handle construction, the combination with a shaft having a slot providing spaced resilient end sections and also having a tapped opening extending through said end sections in right angle relation to said slot, a hub member surrounding said end sections, an operating lever threaded into the tapped opening in one of said end sections, and a set screw threaded into the tapped opening in the other of said end sections and engaging the inner end of said handle to jam the same within the tapped opening in said shaft and to also force said end sections apart to clamp the same against the interior of said hub member.

3. In a handle construction, the combination with a shaft having a slot providing spaced resilient end sections and also having a tapped opening extending through said end sections in right angle relation to said slot, an operating lever threaded into the tapped opening in one of said end sections, a set screw threaded into the tapped opening in the other of said end sections and engaging the inner end of said handle to jam the same within the tapped opening in said shaft and to also apply a force tending to spread said end sections apart, and a rigid member surrounding said end sections to limit spreading thereof under the action of said set screw.

4. In a handle construction, the combination with a shaft having a slot providing spaced resilient end sections and also having a tapped opening extending through said end sections in right angle relation to said slot, a hub member surrounding said end sections, a bent operating handle of rod form threaded into the tapped opening in one of said end sections and a set screw threaded into the tapped opening in the other of said end sections and engaging the inner end of said handle to jam the same within the tapped opening in said shaft and to also force said end sections apart to clamp the same against the interior of said hub member.

5. In a handle construction, the combination with a shaft having a slot providing spaced end sections and also having a tapped opening extending through said end sections in right angle relation to said slot, a cup shaped hub member surrounding said end sections and having side openings therein in alignment with the tapped opening in said shaft, a bent handle of rod form extending through one of the side openings in said cup member and threaded into the tapped opening in one of said end sections and a set screw threaded into the tapped opening in the other of said end sections and engaging the inner end of said handle to jam said handle within the tapped opening in said shaft and to also force said end sections apart to clamp the same against the interior of said hub member.

RICHARD B. HUNTER.